(12) United States Patent
Eitle et al.

(10) Patent No.: US 8,487,761 B2
(45) Date of Patent: Jul. 16, 2013

(54) SAFETY DEVICE FOR A MOTOR VEHICLE SERVICE WORKPLACE

(75) Inventors: Oliver Eitle, Allmersbach (DE); Karl Kastner, Ebersbach (DE)

(73) Assignee: Robert Bosch GmbH, Stuttgart (DE)

( * ) Notice: Subject to any disclaimer, the term of this patent is extended or adjusted under 35 U.S.C. 154(b) by 282 days.

(21) Appl. No.: 12/925,674

(22) Filed: Oct. 26, 2010

(65) Prior Publication Data

US 2011/0133929 A1 Jun. 9, 2011

(30) Foreign Application Priority Data

Nov. 2, 2009 (DE) .......................... 10 2009 046 274

(51) Int. Cl.
*G08B 21/00* (2006.01)
(52) U.S. Cl.
USPC ..................... 340/540; 340/686.6; 340/572.1; 340/573.4; 340/539.11

(58) Field of Classification Search
USPC ............ 340/572.1–572.9, 540, 686.1, 686.6, 340/500, 573.1, 573.4, 539.1, 539.11
See application file for complete search history.

(56) References Cited

U.S. PATENT DOCUMENTS

| | | | | |
|---|---|---|---|---|
| 4,408,195 | A * | 10/1983 | Tullis et al. ................... | 340/685 |
| 6,189,646 | B1 * | 2/2001 | Brandt et al. ................. | 180/273 |
| 6,208,260 | B1 * | 3/2001 | West et al. ................. | 340/691.3 |
| 7,880,604 | B2 * | 2/2011 | McKenna et al. ............. | 340/506 |
| 8,232,888 | B2 * | 7/2012 | Frederick et al. .......... | 340/686.1 |
| 2008/0018472 | A1 * | 1/2008 | Dasilva et al. ............. | 340/572.4 |

* cited by examiner

*Primary Examiner* — Anh V La
(74) *Attorney, Agent, or Firm* — Kenyon & Kenyon LLP

(57) ABSTRACT

A device for ensuring the safety of a motor vehicle service workplace has at least one receiver for receiving a signal emitted by at least one associated transmitter, and an evaluation device which is configured to determine on the basis of the received signal whether the at least one transmitter is located in a danger zone of the motor vehicle service workplace. The device for ensuring the safety is configured to bring devices at the motor vehicle service workplace into a safe condition when the at least one transmitter is located in a danger zone.

16 Claims, 2 Drawing Sheets

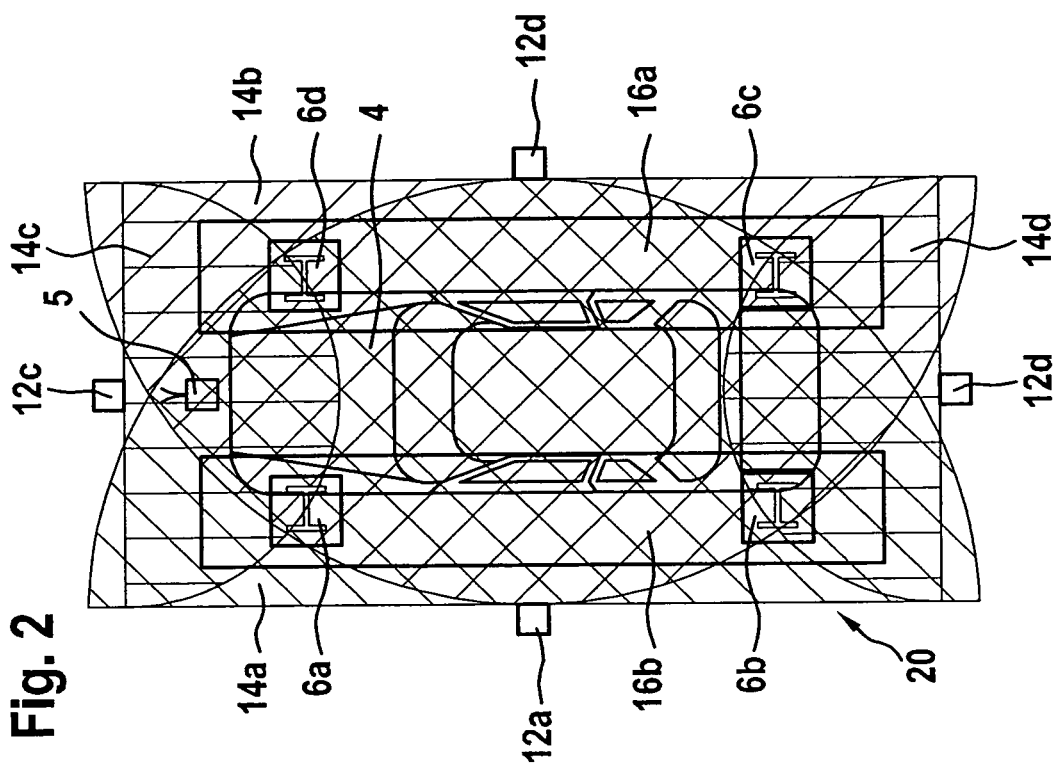
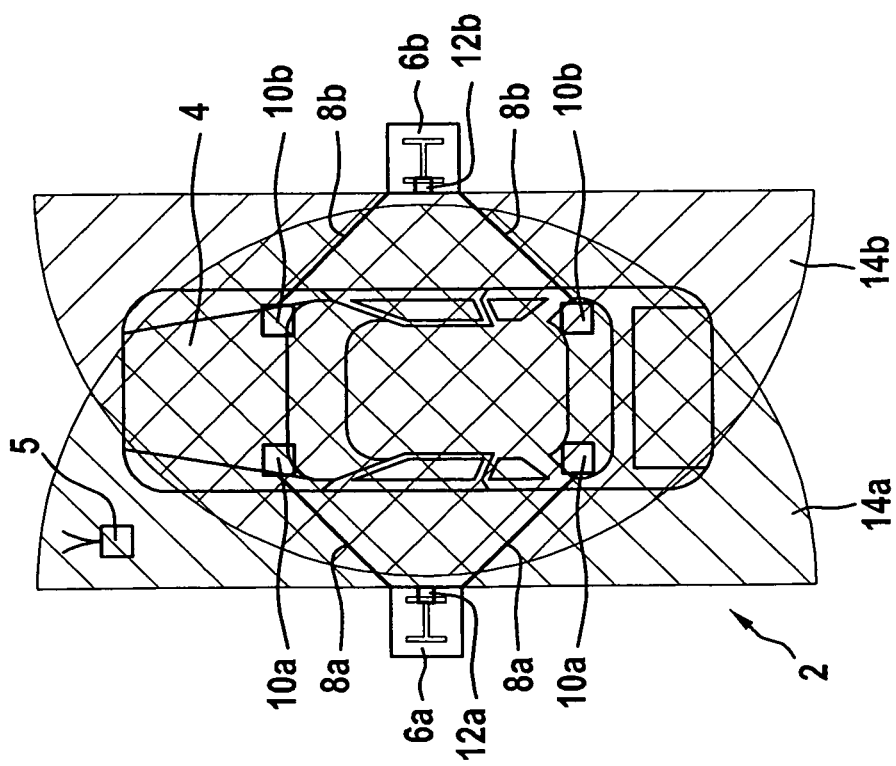

SAFETY DEVICE FOR A MOTOR VEHICLE SERVICE WORKPLACE

BACKGROUND OF THE INVENTION

1. Field of the Invention

The present invention relates to a safety device for a motor vehicle service workplace.

2. Description of Related Art

In automotive technology, workplaces are known which are equipped with mechanical, electrical and/or electromechanical devices such as hydraulic lifts and/or roller dynamometers. During their operation these devices pose risks to persons working in a danger zone, e.g., underneath a hydraulic lift or in the vicinity of the rollers of a roller dynamometer.

Mechanical protection devices such as barriers are frequently provided to prevent people from entering a danger zone when the device is in operation. Such mechanical protection devices are costly and hamper the work at the workplace, especially when the presence of persons in the danger zone is allowed at specific times when the device in question is in a safe condition, and when it is necessary in order to perform the work.

BRIEF SUMMARY OF THE INVENTION

It is an object of the present invention to provide an improved device for ensuring the safety of a motor vehicle service workplace equipped with mechanical and/or electrical devices, by which the risk posed by the mechanical and/or electrical devices to persons present at the workplace or in the vicinity of the workplace is reduced and the work at the workplace is hampered as little as possible.

A device according to the present invention for ensuring the safety of a motor vehicle service workplace has at least one receiver which is configured for receiving a signal emitted by at least one associated transmitter. A device according to the present invention additionally has an evaluation device, which is designed to determine, on the basis of the received signal, whether the transmitter emitting the signal is located in a defined danger zone of the workplace, and to bring the electrical and/or mechanical devices at the workplace into a safe condition when the at least one transmitter is located in a danger zone of the workplace. The signal emitted by the transmitter and received by the receiver may be an electromagnetic signal, for example, or an infrared signal.

A method according to the present invention for ensuring the safety of a motor vehicle service workplace includes the affixation of at least one transmitter, which emits a signal, to persons entering the area of the workplace. Furthermore, the method includes the steps of receiving the signal emitted by the at least one transmitter in at least one receiver, and of determining whether the transmitter emitting the received signal is located in a danger zone. In addition, the method includes the step of bringing the devices at the workplace into a safe condition if the at least one transmitter is located in a danger zone.

A device according to the present invention and a method according to the present invention increase the safety of a workplace because dangerous electrical and/or mechanical devices at the workplace are brought into a safe condition when a person wearing a transmitter enters a danger zone of the workplace.

It is possible to dispense with mechanical safety devices that interfere with access to the workplace and would make the work at the workplace more difficult. The safety at the workplace is able to be increased considerably in this manner without interfering with the work processes at the workplace and/or without reducing the convenience of the persons working at the workplace.

In one example embodiment of the present invention, at least one receiver has a defined directional receive characteristic and/or a defined receiving range. With the aid of such a receiver it is possible to determine in a simple and rapid manner whether the transmitter which emitted the received signal is located within the area defined by the directional receive characteristic and the receiving range of the receiver. Using only a single receiver, in particular, it is possible to ascertain whether the transmitter is located in a defined danger zone, provided the directional receive characteristic and the receiving range of the receiver are adjusted in such a way that they essentially correspond to the danger zone.

In one example embodiment, the motor vehicle service workplace whose safety is ensured with the aid of the device is a workplace in a service repair facility which is equipped with a hydraulic lift and/or a test bench, in particular a roller dynamometer. Workplaces in a vehicle repair facility are able to be effectively protected by a device according to the present invention. This is particularly advantageous because the use of mechanical safety devices such as barricades would significantly interfere with the work processes in a vehicle repair facility in which work on different vehicles is performed continuously.

In one example embodiment, the device is designed to determine the position of a transmitter which has emitted a signal, and to bring electrical and/or mechanical devices at the workplace into a safe condition when the position determination indicates that at least one transmitter is located within a defined danger zone of the workplace.

In one example embodiment, the device has a connection to a central computer, and the danger zone of the workplace is defined by coordinates stored in the central computer. The storage of coordinates of the danger zone in a central computer makes it possible to administer and monitor a workplace equipped with a plurality of potentially dangerous devices in a simple and convenient manner. In particular, such a workplace is easily adaptable to new and/or changed danger zones, which result from the addition or the moving of individual mechanical and/or electrical devices. In an especially effective and cost-advantageous manner, it is also possible to monitor several workplaces with the aid of one shared central computer.

The present invention also includes a system for ensuring the safety of a workplace using a device according to the present invention and a transmitter, which is set up to emit a signal which is able to be received by the receiver. A system that includes a receiver and an associated transmitter makes it especially simple and effective to ensure the safety of the workplace. In particular, it is not necessary for the user himself to select a suitable transmitter and/or to adapt the transmitter(s) to the receiver(s). This simplifies the installation and operation of the system and increases the operational reliability because errors that may occur when the user adapts the transmitter to the receiver(s) and which could lead to a malfunction of the safety device are reliably avoided.

In one example embodiment of a system according to the present invention, the transmitter is an RFID transmitter. RFID transmitters are especially lightweight, cost-effective and require little servicing. A system equipped with RFID transmitters thus is able to ensure the safety a workplace in an effective manner for a multitude of people, without having an adverse effect on convenience by requiring persons working at the workplace to wear heavy transmitters on their bodies or by having only a small number of transmitters available, one of which would then have to be handed over to each person working at the workplace. In particular, any person usually working at the workplace may be equipped with his or her own personal RFID transmitter, which is permanently affixed to the work clothes or to a company identification card of the person.

In one example embodiment, the transmitter includes a satellite navigation receiver such as a GPS receiver, and the signal emitted by the transmitter includes satellite navigation positional data that describe the location of the transmitter. A satellite navigation system provides an especially precise position determination of the transmitter. An exact position determination makes it possible to ensure the safety of a work place even when the boundary between the danger zone and the area in which the persons may and must be staying in order to perform their work must be sharply defined.

In one example development, a method according to the present invention includes bringing the devices at the workplace into a safe condition by switching them off. Switched-off devices, such as stationary roller dynamometers or non-moving hydraulic lifts pose considerably less of a hazard than moving devices. Switching off the devices thus increases the safety at the workplace.

As an alternative or in addition, a method according to the present invention may include bringing the devices into a defined safe condition prior to the switching them off. For example, a hydraulic lift may be driven into a position in which it is impossible to pin a person in an area underneath the hydraulic lift.

In one further example embodiment of the method according to the present invention, an acoustic and/or optical warning signal is output in addition when it is determined that at least one transmitter is located within a defined danger zone. People in the danger zone are thereby able to be warned of the danger, and/or additional persons may be informed that persons are within a danger zone and may possibly require assistance. As an alternative or in addition, the warning signal may be transmitted in wire-bound or wireless manner to a master terminal in order to request external help.

BRIEF DESCRIPTION OF THE DRAWINGS

FIG. 1 shows a schematized illustration of a first workplace equipped with a hydraulic lift and a device according to the present invention for ensuring the safety of the workplace.

FIG. 2 shows a schematized illustration of a second workplace showing an alternative example embodiment of a hydraulic lift and a device for ensuring the safety of the workplace.

DETAILED DESCRIPTION OF THE INVENTION

Figure 3:
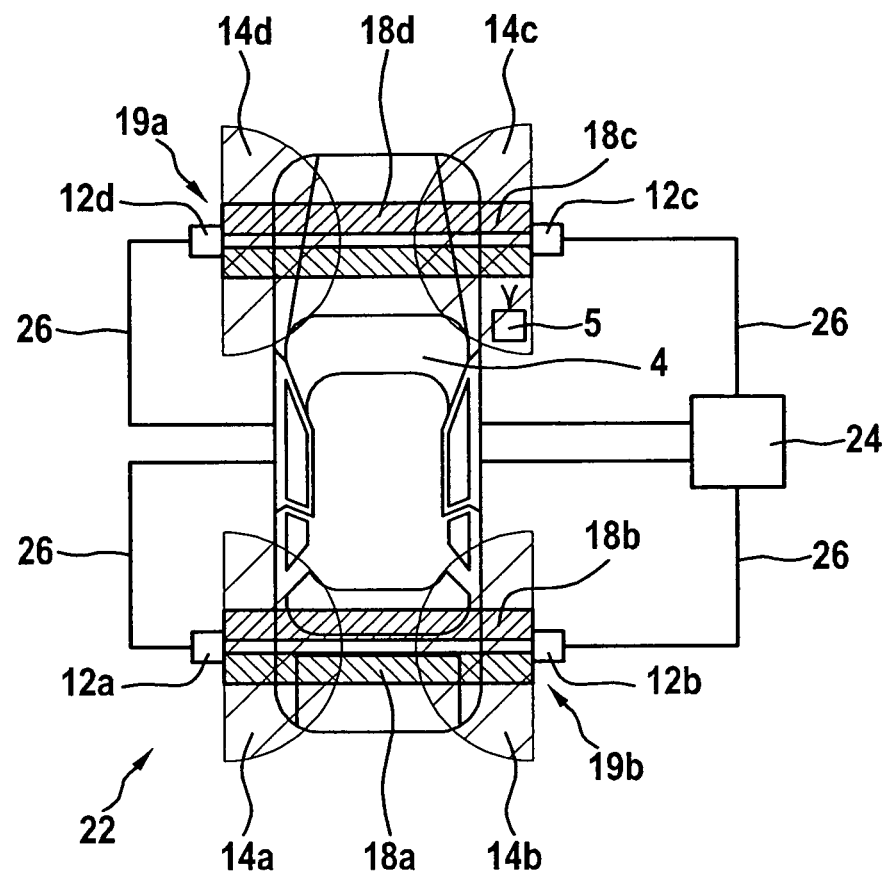
FIG. 3 shows a schematized illustration of a workplace including a roller dynamometer which is equipped with a device according to the present invention for ensuring the safety of the roller dynamometer.

FIG. 1 shows a motor vehicle service workplace 2 equipped with a hydraulic lift 6a, 6b, 8a, 8b, whose safety is ensured by a device according to the present invention. Hydraulic lift 6a, 6b, 8a, 8b has two lifting devices 6a, 6b, which essentially extend perpendicular to the drawing plane. Mounted on each of the two lifting devices 6a, 6b are two tiltable lifting arms 8a, 8b, which the individual lifting device 6a, 6b is able to move in a direction that extends perpendicular to the drawing plane. Lifting arms 8a, 8b are fixed in place on the particular lifting device 6a, 6b in such a way that they are able to be tilted parallel to the drawing plane, from a neutral position (not shown) into the working position illustrated in FIG. 1.

To raise a vehicle 4, vehicle 4 is moved into the position between the two lifting devices 6a, 6b as shown in FIG. 1. Lifting arms 8a, 8b are tilted out of the neutral position (not illustrated) into the working position underneath vehicle 4 as illustrated in FIG. 1, so that the ends of the lifting arms 8a, 8b facing away from lifting devices 6a, 6b are situated underneath defined bearing points 10a, 10b, which are formed on the underside of vehicle 4. In one specific embodiment, lifting arms 8a, 8b are fixed in the working position in order to prevent unintentional swing-back into the neutral position. By activating lifting devices 6a, 6b, lifting arms 8a, 8b are raised perpendicular to the drawing plane of FIG. 1, so that they make contact with the body shell of vehicle 4 at bearing points 10a, 10b. Further raising of lifting arms 8a, 8b raises vehicle 4 to the desired height.

Mounted on each of the two lifting devices 6a, 6b is an individual receiver 12a, 12b having a defined receive characteristic 14a, 14b. Receive characteristic 14a, 14b of the two receivers 12a, 12b is hemispherical in three-dimensional space, so that a semicircular representation comes about in the plan view shown in FIG. 1. Receive characteristics 14a, 14b of the two receivers 12a, 12b are adjusted in such a way that they conform to a danger zone of hydraulic lift 6a, 6b, 8a, 8b.

If a suitable active transmitter 5, i.e., a transmitter 5 emitting a signal, is located in a danger zone of hydraulic lift 6a, 6b, 8a, 8b and thus in at least one of the receiving ranges 14a, 14b of the two receivers 12a, 12b, then the signal emitted by transmitter 5 will be received by at least one of the receivers 12a, 12b. An evaluation device, which is not shown in FIG. 1 and which is connected to receivers 12a, 12b via a connecting line (not shown in FIG. 1), detects that a transmitter 5 is located in at least one of the receiving ranges 14a, 14b. In response, the evaluation device brings hydraulic lift 6a, 6b, 8a, 8b into a safe condition by switching off hydraulic lift 6a, 6b, 8a, 8b, and/or moving it at low speed into a safe position in which, for example, the pinning of a person who is located in the danger zone is impossible.

FIG. 2 shows a schematized illustration of an alternative exemplary embodiment of a motor vehicle service workplace according to the present invention, which features a different type of hydraulic lift.

The hydraulic lift 6a-6d, 16a, 16b shown in FIG. 2 has no tiltable lifting arms 8a, 8b. Hydraulic lift 6a-6d, 16a, 16b has two rectangular, elongated lifting platforms 16a, 16b, whose longitudinal arms are situated parallel to one another. Each lifting platform 16a, 16b is supported by two lifting devices 6a-6d disposed underneath lifting platforms 16a, 16b. Lifting platforms 16a, 16b may be raised by operating lifting devices 6a-6d.

In their retracted state, in which lifting platforms 16a, 16b are lowered to the floor level of the workplace, lifting devices 6a-6d are disposed below the level of the workplace floor, so that no problems will arise if a vehicle 4 drives onto lifting platforms 16a, 16b in the lowered state.

Once a vehicle 4 has been driven onto lifting platforms 16a, 16b and has been secured there against rolling off the platform by pulling a brake of vehicle 4 and/or by additional securing devices such as brake blocks, lifting devices 6a-6d are activated in order to raise lifting platforms 16a, 16b perpendicular to the drawing plane. Lifting devices 6a-6d are preferably operated in synchrony in order to avoid tilting of vehicle 4, or to prevent vehicle 4 from rolling off lifting platforms 16a, 16b.

Once lifting platforms 16a, 16b and vehicle 4 have been raised, a person may step underneath vehicle 4 in order to check, exchange and/or repair devices located underneath vehicle 4, such as an exhaust system. As long as a person is located underneath vehicle 4, lowering of lifting platforms 16a, 16b should be avoided in order to prevent the person from being pinned under vehicle 4 and/or being injured. In the same way, raising of lifting platforms 16a, 16b should be prevented when a person is located in the vicinity of vehicle 4 or on one of lifting platforms 16a, 16b since even a raising that comes as a surprise to a person may result in injury of the person.

An individual receiver 12a-12d is situated at the centers of the four sides of an imaginary rectangle that surrounds vehicle 4 at workplace 20 and that is aligned parallel to the two lifting platforms 16a, 16b. Two receivers 12a, 12d, 12b, 12c are situated in paired manner opposite from each other. Each receiver 12a-12d has an hemispherical receive characteristic 14a-14d in three-dimensional space, which has a semicircular cross-section in the two-dimensional plan view illustrated by FIG. 2. Receive characteristics 14a-14d formed by two receivers 12a, 12d, 12b, 12c, which are situated across from each other in pair-wise manner, are in mirror-symmetry with each other.

As soon as a transmitter 5, which emits a suitable signal, is located in at least one of the four receive regions 14a-14d of receivers 12a-12d, at least one of the receivers 12a-12d receives the signal emitted by transmitter 5. An evaluation device, which is either provided in the particular receiver 12a-12d or is connected to receivers 12a-12d via a wireless or wire-bound data line, ascertains that a transmitter 5 is located in at least one of the danger zones defined by receive characteristics 14a-14d of receivers 12a-12d. In response, the evaluation unit emits a signal to lifting devices 6a-6d, which causes them to be switched off and/or to be driven into a safe condition in which an endangering of the person wearing transmitter 5 and present in the danger zone is avoided or less likely.

Receive characteristics 14a-14d of receivers 12a-12d overlap each other partially and jointly cover the danger zone of workplace 20 in its entirety. The fact that receive characteristics 14a-14d of receivers 12a-12d overlap at least partially increases the safety in the overlap regions still further through redundancy, since the signal of an active transmitter 5, which is located in at least one overlap region, is received by at least two receivers 12a-12d independently of each other. The presence of a transmitter 5 in the danger zone is thus detected in a reliable manner even if one of the receivers 12a-12d is malfunctioning.

FIG. 3 shows a third exemplary embodiment of a motor vehicle service workplace 22 according to the present invention, which is equipped with a roller dynamometer.

The roller dynamometer illustrated in FIG. 3 has a first pair of rollers 19a having two rollers 18a, 18b for a first axle of a vehicle 4, and a second pair of rollers 19a having two rollers 18c, 18d for a second axle of a vehicle 4. The distance between the two roller pairs 19a, 19b is variable, so that the distance between the two roller pairs 19a, 19b is able to be adapted to different distances between the axles of different vehicles 4. It is obvious that the present invention is also able to be applied to a roller dynamometer which has only one pair of rollers 19a, 19b, or for which the distance between roller pairs 19a, 19b is not variable.

In the region of the axial ends of the two rollers 18a-18d of a roller pair 19a, 19b, a receiver 12a-12d having a defined semispherical receive characteristic 14a-14d is situated in each case. Each receiver 12a-12d is connected via a signal line 26 to a central evaluation device 24, which in turn is connected via at least one control line (not shown) to the drive of rollers 18a-18d, which is not shown in the figure. Instead of signal lines 26, a wireless connection such as via a radio or infrared connection may be provided in order to enable a signal transmission between receivers 12a-12d and evaluation device 24, or between evaluation device 24 and the drive of rollers 18a-18d.

In one alternative exemplary embodiment, it is possible to replace central evaluation device 24 with a plurality of decentralized evaluation devices, which are assigned to a particular receiver 12a-12d or a pair of receivers 12a-12d, and/or which are integrated in the particular receivers 12a-12d.

Each receiver 12a-12d has a defined semispherical receive characteristic 14a-14d; in the exemplary embodiment shown in FIG. 3, receive characteristics 14a-14d of receivers 12a-12d situated in paired manner across from each other are in mirror symmetry to a mirror plane that runs perpendicular to rollers 18a-18d in the center of rollers 18a-18d, since roller pairs 19a, 19b, and thus also the danger zones assigned to roller pairs 19a, 19b, are disposed in mirror symmetry with this mirror plane. For devices that are not symmetrical, the danger zones may have any non-symmetrical form, and receive characteristics 14a-14d may be adapted to these danger zones and likewise have a non-symmetrical form.

Each receiver 12a-12d emits an alarm signal to evaluation device 24 when it determines that a transmitter 5 emitting a suitable signal is located in its receive region 14[a]-14d. If evaluation device 24 receives such an alarm signal, then it determines that a transmitter 5 is located in at least one of the defined danger zones and thereupon switches off the drive of at least the particular roller pair 19a, 19b in whose danger zone transmitter 5 is situated. As an alternative, it is also possible to switch off both roller pairs 19a, 19b.

The switch-off of at least one roller pair 19a, 19b prevents that a person wearing the particular transmitter 5 and having entered the danger zone of a roller pair 19a, 19b comes into contact with rotating rollers 18a-18d of roller pair 19a, 19b and suffers injury as a result.

Receivers 12a-12d are mechanically coupled to the axial ends of rollers 18a-18d such that they are moved along if one of the roller pairs 19a, 19b is moved in the longitudinal direction of vehicle 4 in order to adapt the distance of roller pairs 19a, 19b to the axle distance of vehicle 4 to be checked. This has the result that receive characteristics 14a-14d of the corresponding receivers 12a-12d are moved along in synchrony with moved roller pair 19a, 19b. Receive characteristics 14a-14d therefore match the danger zones of roller pairs 19a, 19b in every position of roller pair 19a, 19b.

In the exemplary embodiment shown in FIGS. 1 through 3, each receiver 12a-12d has a defined receive region 14a-14d, which defines the individual danger zone. If a transmitter 5 is located in the danger zone, then the signal it has emitted is received by at least one of receivers 12a-12d. The receiving of the signal by at least one of receivers 12a-12d may thus be equated with the presence of transmitter 5 in at least one danger zone. A further evaluation of the received signal is not necessary for determining whether transmitter 5 is located in at least one danger zone. Such a device is especially simple and operationally reliable because it is possible to dispense with an additional, possibly error-containing evaluation of the received signals.

In one alternative exemplary embodiment, the particular receivers 12a-12d are set up in such a way that they are able to determine the angle and/or the distance at which a transmitter 5, from which the received signal is emitted, is disposed relative to the respective receiver 12a-12d. By evaluating the signals received by receivers 12a-12d, evaluation device 24 is able to determine the precise position of transmitter 5 from which the received has been emitted.

The position determined in this manner is then compared with at least one danger zone stored in the evaluation device. In particular, it is determined whether the position thus determined is located within at least one stored danger zone. With the aid of such a position determination, an especially precise delimitation of the danger zone is possible.

Furthermore, even danger zones having a complex form, whose form is unable to be reproduced by a receive characteristic 14a-14d of a receiver 12a-12d, or to be represented only at considerable expense, are able to be monitored.

As an alternative, transmitter 5 may include a satellite navigation receiver, transmitter 5 determining its position via the data received from the satellite navigation receiver and emitting the position thus determined together with the transmit signal. The position of transmitter 5 is able to be determined in an especially precise manner with the aid of a satellite navigation receiver.

In another exemplary embodiment, at least one defined danger zone is stored in transmitter 5, and an evaluation device provided in transmitter 5 determines through a comparison of the position of transmitter 5 ascertained from the satellite navigation signal, with the at least one defined danger zone whether transmitter 5 is located in a danger zone. If the evaluation device determines that transmitter 5 is situated in at least one danger zone, then transmitter 5 outputs an optical and/or acoustic warning signal in order to warn the person wearing transmitter 5. At the same time, or alternatively, transmitter 5 emits a control signal to a control device provided at workplace 2, 20, 22. Upon receipt of such a control signal, the control device switches off dangerous devices in whose danger zone transmitter 5 is located.

Transmitter 5 may output a continuous transmit signal or a pulsed transmit signal. A continuous transmit signal allows uninterrupted monitoring of the position of transmitter 5, whereas a pulsed transmit signal reduces the power consumption of transmitter 5, since no energy is required for the transmit signal between the pulses in the switch-off times.

If the operation of a plurality of transmitters 5 is provided at a workplace 2, 20, 22 because several persons are working at workplace 2, 20, 22, then all transmitters may emit the same signal because the safety at workplace 2, 20, 22 does not require a determination as to which transmitter 5 is located in a danger zone. The devices at workplace 2, 20, 22 are brought into a safe condition as soon as it is determined that at least one transmitter 5 is located in a danger zone.

As an alternative, each transmitter 5 may emit a different signal, e.g., a signal at a different frequency or a modulated signal, which allows receivers 12a-12d and/or evaluation device 24 to clearly identify the particular transmitter 5, e.g., for the record. In addition, different danger zones may be defined, and/or persons who are experienced or especially qualified and who are identifiable via their assigned transmitters 5 may be allowed to stay in certain dangerous areas even during the operation of potentially dangerous devices 6a-6d, 16a, 16b, 18a-18d, without switching off devices 6a-6d, 16a, 16b, 18a-18d, whereas access to these areas is blocked to less experienced or less qualified persons. The safety device may thus be adjusted as desired to the particular requirements of workplace 2, 20, 22 and to the persons working at workplace 2, 20, 22.

What is claimed is:

1. A device for ensuring the safety of a motor vehicle service workplace, comprising:
   at least one receiver configured to receive a signal emitted by at least one transmitter; and
   at least one evaluation device configured to (i) determine, on the basis of the signal received by the receiver, whether the at least one transmitter is located in a danger zone within the motor vehicle service workplace, and (ii) if the at least one transmitter is located in the danger zone within the motor vehicle service workplace, bring at least one device located at the motor vehicle service workplace into a safe condition.

2. The device as recited in claim 1, wherein the at least one receiver has at least one of a defined directional characteristic and a defined range of reception.

3. The device as recited in claim 2, wherein the device is configured to determine the position of the at least one transmitter.

4. The device as recited in claim 2, wherein the motor vehicle service workplace is provided with at least one of a hydraulic lift and a test bench.

5. The device as recited in claim 2, wherein the device has a connection to a central computer having a memory, and wherein the danger zone is defined by coordinates stored in the central computer.

6. The device as recited in claim 1, wherein the at least one device is at least one of switched off and moved at low speed into a safe position.

7. The device as recited in claim 1, wherein the at least one device is at least one of switched off and moved at low speed into a safe position, and wherein the at least one device includes at least one of an electrical device and a mechanical device.

8. The device as recited in claim 7, wherein the at least one receiver has at least one of a defined directional characteristic and a defined range of reception, wherein the device is configured to determine the position of the at least one transmitter, and wherein the motor vehicle service workplace is provided with at least one of a hydraulic lift and a test bench.

9. The device as recited in claim 8, wherein the device has a connection to a central computer having a memory, and wherein the danger zone is defined by coordinates stored in the central computer.

10. The device as recited in claim 1, wherein the at least one receiver has at least one of a defined directional characteristic and a defined range of reception, wherein the device is configured to determine the position of the at least one transmitter, and wherein the motor vehicle service workplace is provided with at least one of a hydraulic lift and a test bench.

11. The device as recited in claim 10, wherein the device has a connection to a central computer having a memory, and wherein the danger zone is defined by coordinates stored in the central computer.

12. A system for ensuring the safety of a motor vehicle service workplace, comprising:
    at least one transmitter configured to output a signal;
    at least one receiver configured to receive the signal output by the transmitter; and
    at least one evaluation device configured to (i) determine, on the basis of the signal received by the at least one receiver, whether the at least one transmitter is located in a danger zone within the motor vehicle service workplace, and (ii) if the at least one transmitter is located in the danger zone within the motor vehicle service workplace, bring at least one device located at the motor vehicle service workplace into a safe condition.

13. The system as recited in claim 12, wherein the transmitter is an RFID transmitter.

14. The system as recited in claim 12, wherein the transmitter includes a satellite navigation receiver, and the signal output by the transmitter includes satellite navigation position data.

15. A method for ensuring the safety of a motor vehicle service workplace, comprising:
   (a) affixing a transmitter to a person entering the area of the motor vehicle service workplace, the transmitter emitting a signal;
   (b) receiving, by a receiver, the signal emitted by the transmitter;
   (c) determining the position of the transmitter from the received signal; and
   (d) bringing at least one device located at the motor vehicle service workplace into a safe condition when the determined position of the transmitter lies within a defined danger zone.

16. The method as recited in claim 15, wherein the at least one device located at the motor vehicle service workplace is brought into a safe condition by switching off the at least one device.

* * * * *